3,380,471
WET-BARREL FIRE HYDRANT
Frank H. Mueller and John J. Smith, Decatur, Ill., assignors to Mueller Co., Decatur, Ill., a corporation of Illinois
Filed Aug. 24, 1965, Ser. No. 482,222
6 Claims. (Cl. 137—298)

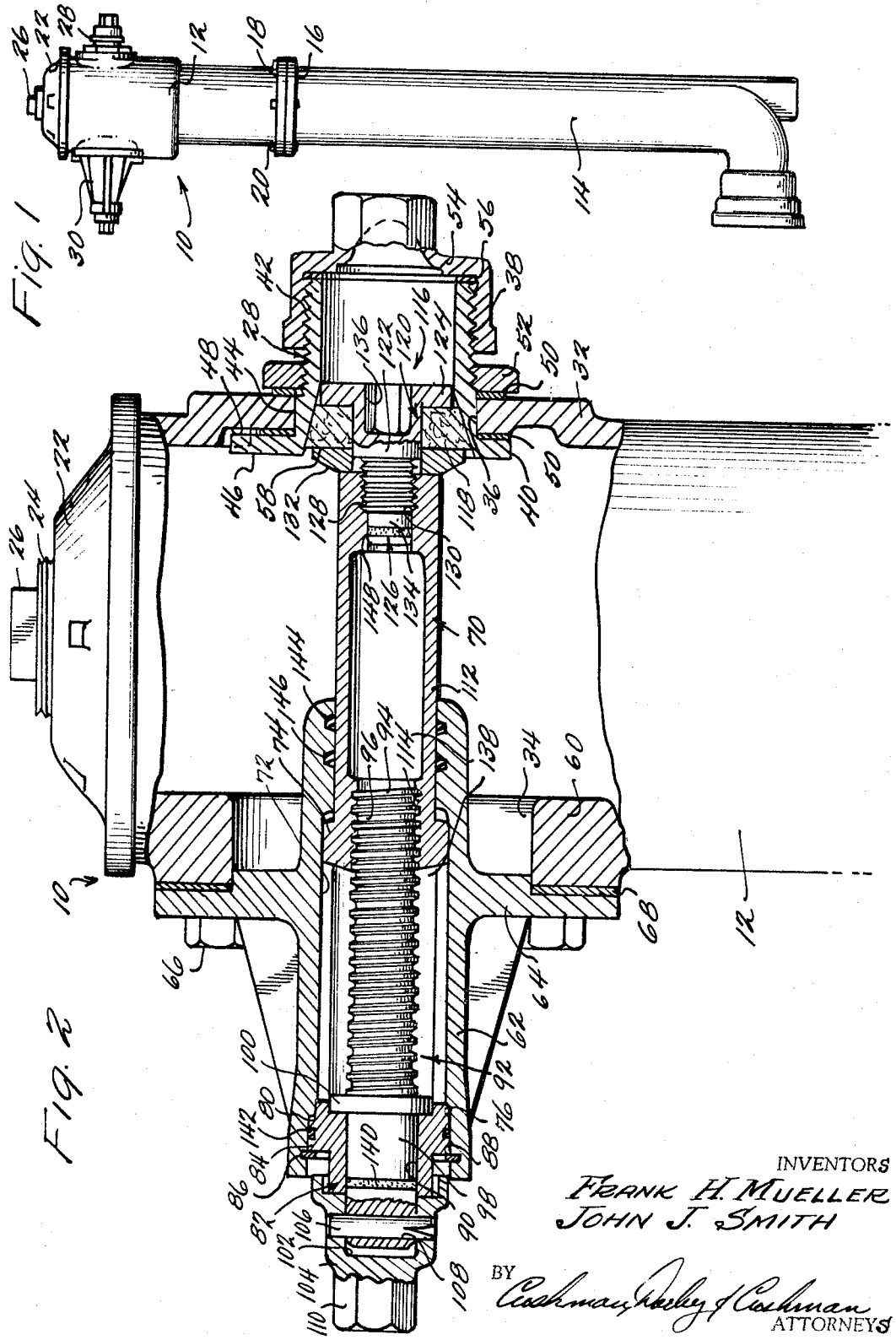

ABSTRACT OF THE DISCLOSURE

A self-contained valve operating unit for a wet-barrel fire hydrant including an operating nut slidably secured in a detachable sleeve and having a valve member on its free end, and an operating member threadably secured to the operating nut and forming an effective seal with the outer end of the sleeve so as to cooperate with the operating nut to define a lubricant reservoir within the sleeve. This self-contained valve operating unit can be removed as an entity from the hydrant barrel without the hazard of damaging the lubricant seal.

---

This invention relates to an improvement in a wet-barrel fire hydrant and, more particularly, to a self-contained valve operating unit therefor. As such, it is an adaptation of the invention disclosed in our co-pending application, Ser. No. 425,662, filed Dec. 28, 1964, and now Patent No. 3,223,110.

The improved valve-operating unit disclosed herein is adapted to be used with wet-barrel hydrants, i.e., those hydrants in which the valve stem extends transversely of the barrel and the valve seat is actually formed on the inner end of the hose nozzle. This type of hydrant is only suitable for warm climates such as Florida, California and Hawaii, where there is no problem of the operating parts of the hydrant becoming inoperative due to the accumulation of ice. Ordinarily the valve stem is carried vertically and reciprocally operates a main hydrant valve which is positioned underground to avoid problems of freezing.

The improved self-contained valve operating unit renders wet-barrel fire hydrants not only cheaper to manufacture, but also easier to maintain and repair. Because the valve operating unit extends transversely of the barrel and is located above ground, this type of unit is inherently easier to maintain and repair. However, there is no valve which ordinarily prevents water from entering the upper part of the barrel and commingling with the operating units. Thus, due to the fact that the operating unit is in constant association with water, non-lubricated valve operating stems have had problems with seizure thus making the hydrant completely inoperative.

Accordingly, it is an object of this invention to provide an improved lubricated operating assembly for the valve stem of a wet-barrel fire hydrant. Furthermore, it is an object of this invention to provide an inexpensive and effective seal for enclosing the lubricant reservoir of such an assembly.

The operating unit basically comprises an operating member or shaft which is swivelly mounted in a bonnet and extends into and transversely of a hollow hydrant barrel. An elongated operating nut is coaxially aligned with the operating member and is threadably engaged thereto. Obviously, it is desirable to enclose such threaded engagement in a lubricant reservoir. A reciprocating valve member or head including a washer is detachably secured to the other end of the operating nut and cooperates with the valve seat formed on the inner end of the hose nozzle. It sometimes becomes necessary to remove the valve operating unit for repair, such as the replacement of defective seals or a defective washer. Existing constructions require the complete disassembly of the valve operating unit in the field in order to effect such removal and repair. If the lubricant reservoir is full of oil, the disassembly of the operating unit will break the seal and allow the lubricant to drain out of its reservoir, on, or around the hydrant with a resulting "mess." Furthermore, the removal, repair, and subsequent replacement of the operating unit takes considerable time. With a wet-barrel type hydrant, it is necessary to shut off the water remotely from the fire hydrant before removing the valve operating unit. Consequently, it is desirable to minimize out-of-service condition of this water system.

Accordingly, it is an object of this invention to provide a self-contained valve operating unit which can be removed as an entity from the hydrant barrel without the hazard of damaging the lubricant seals.

Furthermore, it is an object of this invention to provide a valve operating unit for a wet-barrel hydrant which is permanently lubricated so that it is not necessary to replenish the lubricant at periodic intervals.

Likewise, it is another object of this invention to provide a valve operating unit which is interchangeable with other valve operating units so that a stock of such assemblies can be maintained. Accordingly, when one unit becomes defective, it is only necessary to shut off the water for a short time while the old unit is removed and a new unit installed in the hydrant barrel. The old unit can then be repaired in the shop instead of on the spot in the field. Such repairs can be effected in the shop with greater facility and less mess.

Other objects and advantages of the invention will become apparent from the following description and accompanying drawings in which:

FIGURE 1 is a side elevational view of a wet-barrel fire hydrant embodying the invention; and FIGURE 2 is an enlarged side elevational view, partly in section, of the upper portion of the fire hydrant shown in FIGURE 1.

Referring now to the drawings there is shown in FIGURE 1 a wet-barrel fire hydrant 10 having a hollow upper barrel 12 and an integral combined hollow lower hydrant barrel and shoe 14 adapted to be connected to a water main (not shown). The lower barrel 14 has a flange 16 at its upper end which mates with a corresponding flange 18 on the lower end of the upper barrel 12. The two barrel sections are secured together preferably by means of frangible bolts 20 so that when the upper barrel is subjected to a severe blow, such as by being hit by a motor vehicle, the upper barrel section can be knocked over without damage to either section. Generally the fire hydrant is buried in the ground up to a point adjacent and below the abutting flanges.

The upper barrel 12 terminates in an integral cap 22 having a central threaded aperture 24, seen more particularly in FIGURE 2, which is closed by means of an exteriorly threaded plug 26. The upper barrel is provided with a hose nozzle 28 on one side thereof and an enlarged aligned opening closed by a bonnet 30 on the opposite side thereof. While only one nozzle and bonnet are shown, it will be appreciated that there can be numerous variations in the number, spacing and location of the nozzles and bonnets, and to accommodate such variances the upper barrel could be enlarged.

As seen more particularly in FIGURE 2 a wall 32 defines the hollow barrel and is perforated by a pair of oppositely and transversely disposed openings, one opening being a valve-operator opening 34 in which a valve operating unit carried by the bonnet 30 is disposed and the other opening being a nozzle opening 36 in which the hose nozzle 28 is secured.

The hose nozzle 28 comprises a sleeve 38 having a radial flange 40 formed on its inner end adapted to abut against the inner wall of the barrel. The exterior portion of the sleeve is threaded, and in the preferred embodiment of the invention, the exterior threads 42 terminate at a position disposed from the flange 40 to define therebetween a smooth, threadless portion 44 having a cross-sectional configuration and an axial length substantially corresponding to the cross-sectional configuration and length of the nozzle opening 36 in the barrel wall. The flange 40 has a radial projection 46 which is disposed within a recess 48 formed in the interior surface of the hydrant wall 32 adjacent the nozzle opening 36. The recess 48 and projector 46 cooperate to restrain rotational movement of the hose nozzle 28 when, for instance, a hose is secured to the free end thereof. It will be appreciated that while the major dimension of the flange is greater than the nozzle opening, it is preferably smaller than that of the oppositely disposed valve-operator opening 34 so that the nozzle can be inserted through the valve-operator opening and moved into its seated position in the nozzle opening. When the nozzle is seated, the exterior threads start approximately at the outer surface of the barrel wall and extend outwardly to the end of the hydrant nozzle. In order to make the nozzle leak-proof around its exterior, a pair of gaskets 50 are positioned exteriorly of the sleeve on both sides of the barrel wall. In one instance the flange 40 holds the gasket 50 against the inner barrel wall, and in the other instance a lock nut 52 is threadably mounted on the exterior of the sleeve and holds the gasket 50 against the outer wall of barrel as well as retains the nozzle in the nozzle opening. When not in use, the hose nozzle is closed by an interiorly threaded cap 54 which engages the exterior threads 42 of the sleeve. Preferably a gasket 56 is carried by the cap adjacent its inner top surface for abutting against the end of the nozzle when the cap is screwed in place. The interior surface of the sleeve is substantially smooth and terminates at its inner end in a smooth, inwardly flaring, frusto-conical valve seat 58.

On the opposite side of the barrel the valve-operator opening is preferably defined by an annular thickened wall portion 60 for reinforcing purposes to which the bonnet 30 is detachably connected. More particularly, the bonnet 30 comprises a tubular member or hollow sleeve 62 having an integral flange 64 extending radially outwardly therefrom intermediate its two ends for substantially covering the thickened wall portion 60 in the installed position of the bonnet. The flange has a plurality of circumferentially spaced apertures, not shown. A plurality of bolts 66 are inserted through the apertures and are engaged in tapped recesses or sockets, not shown, in the thickened wall portion. Alternatively the thickened wall portion 60 may be provided with threaded studs, not shown, which extend outwardly from the thickened wall portion and on which the flange of the bonnet is mounted and secured by nuts, not shown. Of course, it is within the scope of the invention to include any other type of releasable means for securing the bonnet to the thickened wall portion. In order to secure a fluid-tight fit, an annular gasket 68 is positioned between the flange and the thickened wall portion.

The sleeve 62 of the bonnet 30 serves as a guide for snugly receiving a coaxially aligned externally smooth operating nut 70 which extends through a smooth bore in the inner end of the sleeve. The sleeve has an interior longitudinal keyway 72 outwardly of the bore which cooperates with a radial lug 74 on the outer end of the operating nut to restrain rotation of the nut with respect to the sleeve while allowing the nut to reciprocate. It is within the scope of the invention to provide any common mechanical equivalent to prevent relative rotation while allowing reciprocation of the nut. Because the keyway 72 terminates inwardly of the inner end of the sleeve, there is no problem of the nut being pulled out of the sleeve.

The outer end of the sleeve has a counterbore 76 terminating at its inner end in an outwardly facing annular shoulder 80. The radius of the counterbore is greater than the radius of the keyway in the sleeve so that the operating nut can be assembled and disassembled by sliding it axially out of the sleeve. Disposed in the counterbore 76 is a bush bearing 82 having an integral circumferential flange 84 seated on the shoulder 80. A split ring 86 disposed in a circumferential groove 88 in the counterbore 76 overlies the flange 84 to maintain the bearing 82 in place. It will be seen that the bearing closes the outer end of the keyway. In order to disassemble the unit, it is only necessary to remove the split ring 86, and the bush bearing as well as the operating nut can slide out of the sleeve.

The bush bearing 82 has a bore 90 extending therethrough coaxially with the sleeve in which is received an operating member 92. The operating member comprises a shaft having a threaded inner portion 96, an externally smooth outer portion 98 and a flange 100 projecting radially outwardly from the shaft intermediate the inner and outer portions thereof. The smooth outer portion 98 of the shaft is received in the bush bearing. The flange 100 abuts against the inner end of the bush bearing 82 in order to restrain outer axial movement of the shaft. The outer smooth portion 98 extends outwardly beyond the end of the bush bearing and is received in a socket 102 of a cap 104. The cap 104 is secured to the operating member 92 by a pin 106 force-fitted through aligned transverse apertures 108 in the cap and operating member. The inner end of the cap 104 bears against the bush bearing 82 so as to restrain inward axial movement of the shaft. It can be seen therefore that the cap 104, bush bearing 82 and the flange 100 cooperate to form a swivel mounting for the operating member 92 which allows rotational movement thereof while restraining axial movement thereof. The cap 104 has a non-circular wrench engageable portion 110, so that the cap and operating shaft secured thereto can be rotated. It will be appreciated that other means could be associated with the cap which would enable an instrument to rotate the same.

As illustrated, the operating nut is a hollow sleeve-like body having interior threads at the outer end thereof is adapted to engage the threaded portion 96 of the operating member. The other or inner end of the operating nut has a valve member 116 secured thereto.

The valve member 116 includes a valve washer 118, of rubber or the like, which is adapted to cooperate with the valve seat 58 of the nozzle 28 to close the same. In addition the valve member includes a washer carrier 120 having a hub 122 around which the washer is positioned and an integral flange secured to the outer end of the hub. The hub is provided with an integral coaxial shank having a threaded portion 128 in a threaded section of a bore 130 within the inner end of the operating nut. An annular washer retainer ring 132 is positioned over the threaded shank and the hub so as to rest against the washer. When the washer carrier is threaded into the inner end of the operating nut, the washer retainer ring bears against the inner end of the operating nut and securely clamps the washer between the ring 132 and the flange 124. As illustrated, the shank also includes a smooth cylindrical portion 134 received in a smooth-walled portion of the bore 130 in the inner end of the operating nut. The hub 122 has a non-circular coaxial wrench, engageable socket 136 in its outer end to enable the washer carrier to be assembled and disassembled from the operating nut so that, if necessary, the washer can be replaced.

In order to combat the problem of seizure, it is desirable to lubricate the threadedly-engaged portion of the operating member and the operating nut. Consequently, it will be seen that the hollow sleeve and the hollow operating nut define a reservoir 138. Accordingly, it is necessary to provide a plurality of seals which will prevent lubricant in such reservoir from escaping. In order to make the self-contained valve operating unit fluid-tight a groove is provided in the smooth shaft portion 98 of the operating member for receiving a resilient packing ring 140, such as an O-ring, which provides a seal between the bore 90 of the bush bearing 82 and the smooth surface 98 of the operating member. Likewise, there is an annular groove in the flange 84 of the bush bearing for receiving an O-ring 142 by which a seal between the bush bearing and the counterbore 76 of the sleeve of the bonnet is provided. A more difficult surface to seal is the surface between the smooth bore in the inner end of the sleeve and the smooth outer surface of the operating nut. As illustrated, a pair of annular grooves receiving O-rings 144 and 146, is provided in the bore through the inner end of the sleeve member for effecting the seal between these relatively moving parts. The inner O-ring 144 serves as a wiper ring to clean the exterior surface of the operating nut from accumulated corrosion. The cleaned surface is then sufficiently smooth to form an effective seal with the outer O-ring 146. It will be appreciated that the resilient packing ring type of seal could be replaced by a rolling diaphragm seal, such as disclosed in our previous application, Ser. No. 425,662 filed Dec. 28, 1964. Finally, an annular groove is formed in the smooth cylindrical portion 134 of the shank 126 of the washer carrier 120 for receiving an O-ring 148. This O-ring effects a seal between the shank and the smooth portion of the bore 130 extending through the inner end of the operating nut. It will be appreciated that if the threaded portion of the bore 130 in the inner end of the operating nut is replaced by a threaded socket, the inner end of the operating nut will be integrally sealed and O-ring could be omitted.

In operation, it will be seen that the rotation of the operating member 92 causes the operating nut 70 to be reciprocated axially of the bonnet sleeve 62. Accordingly, the valve member 116 including the washer 118 can be axially moved away from its seated association with the inwardly facing valve seat 58 of the hose nozzle so as to allow water to flow into the valve nozzle and through the same when the hose cap is removed. Prior to assembly the lubricant reservoir is partially filled with a measured quantity of lubricant which, in use, maintains the threaded connection between the operating nut and the operating member in good working condition and prevents the problem of seizure. If some part of this self-contained valve operating unit needs repair, it is only necessary to shut off the water in the water main, remove the bolts holding the bonnet flange secure to the thickened wall portion of the hydrant barrel, remove the whole valve operating unit, replace the valve operating unit with a new unit, and turn on the water in the water main. The entire operation consumes only a few minutes and allows the valve operating unit to be repaired at the factory which is far more convenient and economical.

It thus will be seen that the objectives of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

It is claimed:
1. For use with a fire hydrant having a hollow barrel with a pair of transversely aligned valve-operator and nozzle openings communicating with the interior of the hollow barrel, the nozzle opening having secured therein a hose nozzle provided at the inner end thereof with an inwardly facing valve seat, a self-contained valve-operating unit comprising:
  bonnet means adapted to close the valve-operator opening and provided with means for detachably connecting the bonnet means to the barrel, the bonnet means comprising a hollow sleeve adapted to extend coaxially of the valve-operator opening and to be detachably connected to the barrel, the sleeve having a counterbore adjacent its outer end;
  an operating nut coaxially aligned with the sleeve and having an interiorly threaded outer end slidably received within the sleeve, the operating nut having means cooperating with the sleeve member for restraining rotation of the operating nut;
  means effecting a liquid-tight seal between the operating nut and the inner end of the sleeve;
  a reciprocating valve member including a valve washer secured to the inner end of the operating nut, the valve member and valve washer being adapted to cooperate with the valve seat so as to open and close the nozzle;
  an operating member swivelly mounted in the sleeve member and having an outer end projecting exteriorly of the barrel for engagement by an operating tool and an inner end threadedly engaged with the outer end of the operating nut, whereby rotation of the operating member reciprocates the operating nut and the valve member to seat and unseat the latter, the operating member comprising a shaft having a threaded inner portion, an exteriorly-smooth outer portion, and an integral circumferential flange intermediate the inner and outer portions thereof, the flange operatively cooperating with the sleeve member for restraining outward axial movement of the shaft;
  a bush bearing having an integral flange disposed in the sleeve counterbore and means for retaining the bush bearing therein, the bush bearing having a smooth cylindrical bore which receives the outer portion of the shaft;
  sealing means between the outer portion of the shaft and the cylindrical bore; and
  sealing means between the bush bearing and the sleeve so that the sleeve together with the operating member and nut define a liquid-tight lubricant reservoir.

2. The structure defined in claim 1 in which the sleeve has a longitudinal keyway and the operating nut has a lug projecting exteriorly from the outer end thereof which is received in and guided by the keyway.

3. The structure defined in claim 1 in which the sealing means between the sleeve and the operating nut comprises a pair of resilient packing rings carried in corresponding interior circumferential grooves in the sleeve and engaging a smooth exterior surface on the operating nut.

4. The structure defined in claim 1 including an operating cap having a wrench engageable projection, the cap being detachably secured to the outer portion of the shaft and bearing against the bush bearing for restraining inward axial movement of the shaft.

5. The structure defined in claim 1 in which the valve member comprises a washer carrier having a hub with a coaxial tool-engageable socket in its outer end, an integral flange secured to the outer end of the hub, and an integral coaxial threaded shank portion; a valve washer having an outer edge adapted to engage the inwardly facing valve seat of the hose nozzle, the valve washer being seated on the flange of the washer carrier; a washer retainer ring on the threaded shank portion of the washer carrier and clamping the valve washer in its seated position on the flange of the washer carrier; and the threaded shank portion being threadedly engaged in the inner end of the operating nut, the inner end of the operating nut bearing against the washer retainer ring thereby clamping the valve washer between the retainer ring and the flange.

6. The structure defined in claim 5 in which the washer carrier includes an inner smooth cylindrical shank portion and in which the operating nut has a cylindrical bore extending through its inner end, the outer portion of the bore being threaded and the inner portion being smooth and complementary to the smooth shank portion of the washer carrier, and including sealing means between the smooth cylindrical bore portion and the smooth cylindrical shank portion.

References Cited
UNITED STATES PATENTS

| | | | |
|---|---|---|---|
| 953,370 | 3/1910 | Carr et al. | 251—274 |
| 1,792,945 | 2/1931 | Van Deventer | 251—274 X |
| 2,139,280 | 12/1938 | McBride | 251—355 X |
| 2,346,938 | 4/1944 | Oravec | 251—357 X |

WILLIAM F. O'DEA, *Primary Examiner.*

R. GERARD, *Assistant Examiner.*